United States Patent
Kobayashi et al.

(10) Patent No.: US 6,560,982 B2
(45) Date of Patent: May 13, 2003

(54) THERMAL EXPANSION VALVE

(75) Inventors: Kazuto Kobayashi, Tokyo (JP); Kazuhiko Watanabe, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 10/117,049

(22) Filed: Apr. 8, 2002

(65) Prior Publication Data

US 2002/0162896 A1 Nov. 7, 2002

(30) Foreign Application Priority Data

Apr. 13, 2001 (JP) ........................................ 2001-115785

(51) Int. Cl.[7] ................................................ F25B 41/09
(52) U.S. Cl. ........................................ 62/225; 236/92 B
(58) Field of Search ............................ 236/92 B; 62/225

(56) References Cited

U.S. PATENT DOCUMENTS

| | | | | |
|---|---|---|---|---|
| 5,597,117 A | * | 1/1997 | Watanabe et al. | 236/92 B |
| 5,826,438 A | * | 10/1998 | Ohishi et al. | 236/92 B |
| 5,943,871 A | * | 8/1999 | Ito et al. | 236/92 B |
| 5,957,376 A | * | 9/1999 | Fujimoto et al. | 236/92 B |
| 5,961,038 A | * | 10/1999 | Okada | 236/92 B |
| 6,145,753 A | * | 11/2000 | Yano et al. | 236/92 B |

FOREIGN PATENT DOCUMENTS

| EP | 0 775 877 A2 | * | 5/1997 | ............. F25B/1/06 |
|---|---|---|---|---|

* cited by examiner

*Primary Examiner*—William C. Doerrler
*Assistant Examiner*—Mohammad M. Ali
(74) *Attorney, Agent, or Firm*—Rader, Fishman & Grauer PLLC

(57) ABSTRACT

A thermal expansion valve 100 comprises a square column shaped valve body 110, and the valve body 110 contains a first passage 120 with a bottom to which the refrigerant is introduced, a valve chamber 122 formed near the bottom of the passage, a second refrigerant passage 126 traveling toward the evaporator, and a third refrigerant passage 128 returning from the evaporator. A valve means 130 equipped within the valve chamber is fixed to the working rod 132 and operated by a power element 160. The working rod 132 comprises a small-diameter portion 135, and the valve means 130 is fixed by a welding process $W_1$ thereto with a valve seat 200 equipped in advance. The valve seat member 200 is press fit using the working rod 132 to a hole 116 formed to the valve body.

7 Claims, 3 Drawing Sheets

THERMAL EXPANSION VALVE

FIELD OF THE INVENTION

The present invention relates to a thermal expansion valve equipped in a refrigeration system of an air conditioner for a vehicle and the like for controlling the flow of refrigerant being provided to an evaporator according to the temperature of the refrigerant.

DESCRIPTION OF THE RELATED ART

FIG. 3 is an explanatory view showing the vertical cross-section of the structure of a conventionally known thermal expansion valve.

A thermal expansion valve shown as a whole by reference number 1 comprises a square column shaped valve body 10 made of aluminum alloy and the like. The valve body 10 comprises a passage 20 for receiving a high-pressure refrigerant transmitted from a compressor of the air conditioner, and a valve chamber 22 formed to the lower portion of the valve body 10 that communicates with the passage 20.

The valve chamber 22 communicates the passage 20 with a passage 26 via a valve seat 24, and the refrigerant is sent out through the passage 26 toward an evaporator.

Within the valve chamber 22 is equipped a spherical valve means 30 that opposes against the valve seat 24, and the valve means 30 is supported by a valve means support member 32. The valve means support member 32 is supported via a spring 34 by a nut member 36 functioning as an adjustment screw. The nut member 36 is screwed onto the valve body 10 at a screw thread portion 37 by a tool such as a wrench and the like utilizing a hexagon hole 38 formed thereto.

By adjusting the depth of the nut member 36 being screwed onto the valve body, the spring force of the spring 34 supporting the valve means 30 can be controlled so that the valve means 30 is biased toward the direction closing the valve. A seal member 39 is fixed to the nut member 36, thus preventing the refrigerant from leaking out of the valve chamber 22.

The valve body 10 contains a return passage 28 of the refrigerant returning from the evaporator toward the compressor, formed in parallel with the passage 26.

The valve means 30 is operated through a working rod 40 that penetrates the center portion of the valve body 10. The working rod 40 is a small-diameter rod made of stainless steel and the like, the upper end thereof being inserted to a stopper member 50 and the lower end coming into contact with the valve means 30.

A seal member 42 is equipped between the working rod 40 and the valve body 10, which constitutes a seal between the passage 26 through which the refrigerant is sent out and the passage 28 through which the refrigerant returns.

The stopper member 50 is equipped within a driving device so-called a power element and shown as a whole by reference number 60.

The power element 60 comprises a disc-shaped can body 62 defined by an upper lid 621 and a lower lid 622, the can body 62 being screwed onto the upper portion of the valve body 10 via a screw thread 64 formed to the lower lid 622, and the periphery of the stopper member 50 being supported by the lower lid 622.

The can body 62 contains a diaphragm 66, and the periphery of the diaphragm is sandwiched between the upper lid 621 and the lower lid 622, which are fixed to each other by welding, defining an upper pressure chamber 68 and a lower pressure chamber 69. A working fluid is filled within the upper pressure chamber 68, and is sealed by a plug body 70.

The pressure of the refrigerant passing through the return passage 28 of the refrigerant operates on the lower surface of the stopper member 50, and the temperature of the refrigerant is transmitted via the working rod 40 to the stopper member 50, and further transmitted via the diaphragm 66 to the working fluid within the upper pressure chamber 68.

The diaphragm 66 is displaced by the pressure within the upper pressure chamber 68, the amount of displacement thereof moving the valve means 30 through the working rod 40, thus decompressing and expanding the refrigerant flowing through the passage 20, adjusting the opening area of the orifice passage constituting the valve seat 24, and controlling the flow of refrigerant traveling toward the evaporator.

In such conventional thermal expansion valve, the structure requires a large number of parts including the valve receiving member, the spring and the adjustment screw, making it difficult to reduce the size and the weight of the thermal expansion valve.

Moreover, a problem sometimes occurs according to the prior art valve in which the refrigerant leaks out of the valve chamber through the adjustment screw portion.

SUMMARY OF THE INVENTION

Considering these points, the object of the present invention is to provide a thermal expansion valve having a simplified structure and smaller number of parts being required, thus enabling to correspond to the desired reduction of size and weight of the car air conditioner.

In order to achieve the above objects, the present invention provides a thermal expansion valve comprising a valve body, a first passage formed to the valve body through which high pressure refrigerant travels, a valve chamber formed within the first passage, a second passage formed to the valve body in parallel with the first passage through which refrigerant traveling toward an evaporator travels, an orifice passage to which a valve seat member is press fit for communicating the valve chamber with the second passage, a valve means positioned opposing the orifice passage, a third passage through which refrigerant being sent out of the evaporator travels, and a temperature sensing rod for sensing the temperature of the refrigerant traveling through the third passage and driving the valve means according thereto; characterized in that the valve seat member is mounted between the working rod and the valve means in advance before it is fixed to the orifice passage, and the opening area of the orifice passage is adjusted by the displacement of the valve means.

Further, the above working rod comprises a small-diameter portion being inserted to the valve seat member, and having a spherical valve means fixed to the end of the small-diameter portion.

Moreover, the present valve is equipped with a spring that biases the working rod toward the diaphragm.

DETAILED DESCRIPTION OF THE PREFERRED EMBODIMENT

Figure 1:
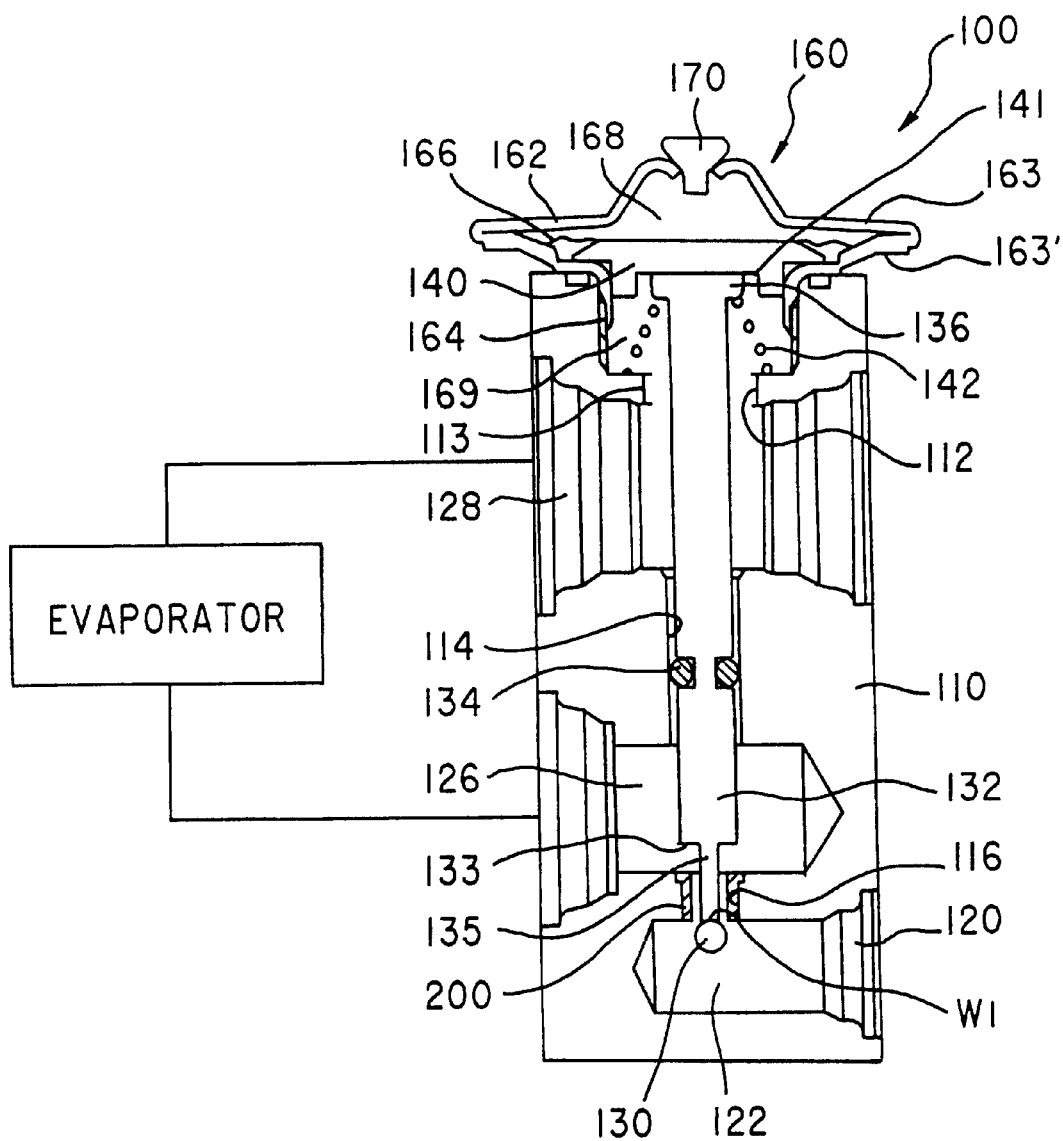
FIG. 1 is a cross-sectional view of the thermal expansion valve according to the present invention.

FIG. 1 is an explanatory view showing the vertical cross-sectional view of the thermal expansion valve according to the preferred embodiment of the present invention.

A thermal expansion valve shown as a whole by reference number 100 comprises a valve body 110, the valve body 110 being a square column shaped member made for example of aluminum alloy.

A first passage 120 for receiving the high-pressure refrigerant transmitted from a compressor constituting an air conditioner is formed to the lower area of the valve body 110. The first passage 120 is a hole having a bottom portion, with a valve chamber 122 formed near the bottom thereof. The valve chamber 122 is communicated with a second passage 126 formed within the valve body 110 in parallel with the first passage 120 through a valve seat member 200 press-fit to a hole 116 defining an orifice passage formed perpendicular to the first passage 120 within the valve body 110. The second passage 126 is for sending out the refrigerant toward the evaporator.

The upper portion of the valve body 110 comprises a third passage 128 formed in parallel with the second passage 126.

The third passage 128 penetrates the valve body 110, and through the third passage travels the refrigerant returning from the evaporator toward the compressor.

Within the valve chamber 122 is positioned a spherical valve means 130 so as to oppose to the orifice passage from the upper stream side of the first passage 120, and the valve means 130 is welded and fixed to the lower end of the working rod 132.

The working rod 132 slides within a vertical hole 114 formed within the valve body 110, and a seal member 134 equipped to the working rod 132 constitutes a seal between the second passage 126 and the third passage 128.

The working rod 132 penetrates a hole 112 formed to the valve body 110, the upper end 136 of the rod coming into contact with a stopper member 140.

A driving equipment so-called a power element shown as a whole by reference number 160 comprises a can body 162 composed of a stainless steel upper lid 163 and lower lid 163'. The can body 162 is screwed onto the upper end of the body 110 through a screw portion 164 formed to the lower lid 163', and the periphery of the stopper portion 140 is supported by the lower lid 163'. A diaphragm 166 is provided to the can body 162, the periphery of the diaphragm being sandwiched between the upper lid 163 and the lower lid 163' and fixed thereto by welding, thus defining an upper pressure chamber 168 and a lower pressure chamber 169.

A working fluid such as a refrigerant is filled in the upper pressure chamber 168, which is sealed thereto by a plug body 170.

The upper surface of the stopper member 140 comes into contact with the diaphragm 166. A coil spring 142 is placed between a step portion formed to the upper end 136 of the working rod 132 coming into contact with the lower surface of the stopper member 140 and a projection 113 of the valve body 110 constituting the hole 112. The spring force of the coil spring biases the stopper member 140 through the working rod 130 toward the upper pressure chamber 168. Further, a recessed portion 141 is formed to the lower surface of the stopper member 140, the upper end 136 of the working rod 130 coming into contact with the bottom surface of the recessed portion 141.

The refrigerant passing through the third passage 128 returning from the evaporator toward the compressor travels through the hole 112 of the valve body 110 and transmits pressure to the lower surface of the stopper member 140.

The working rod 132 functions as a heat sensing member, and transmits the temperature of the refrigerant passing through the third passage 128 to the working fluid inside the upper pressure chamber 168 via the stopper member 140 and the diaphragm 166.

The working rod 132 is displaced to a position where the pressure within the pressure chamber is balanced with the pressure working on the lower surface of the stopper member, thereby adjusting the opening area of the orifice passage by the valve means 130 and controlling the flow of refrigerant traveling through the first passage 120 and the second passage 126 toward the evaporator.

Figure 2:
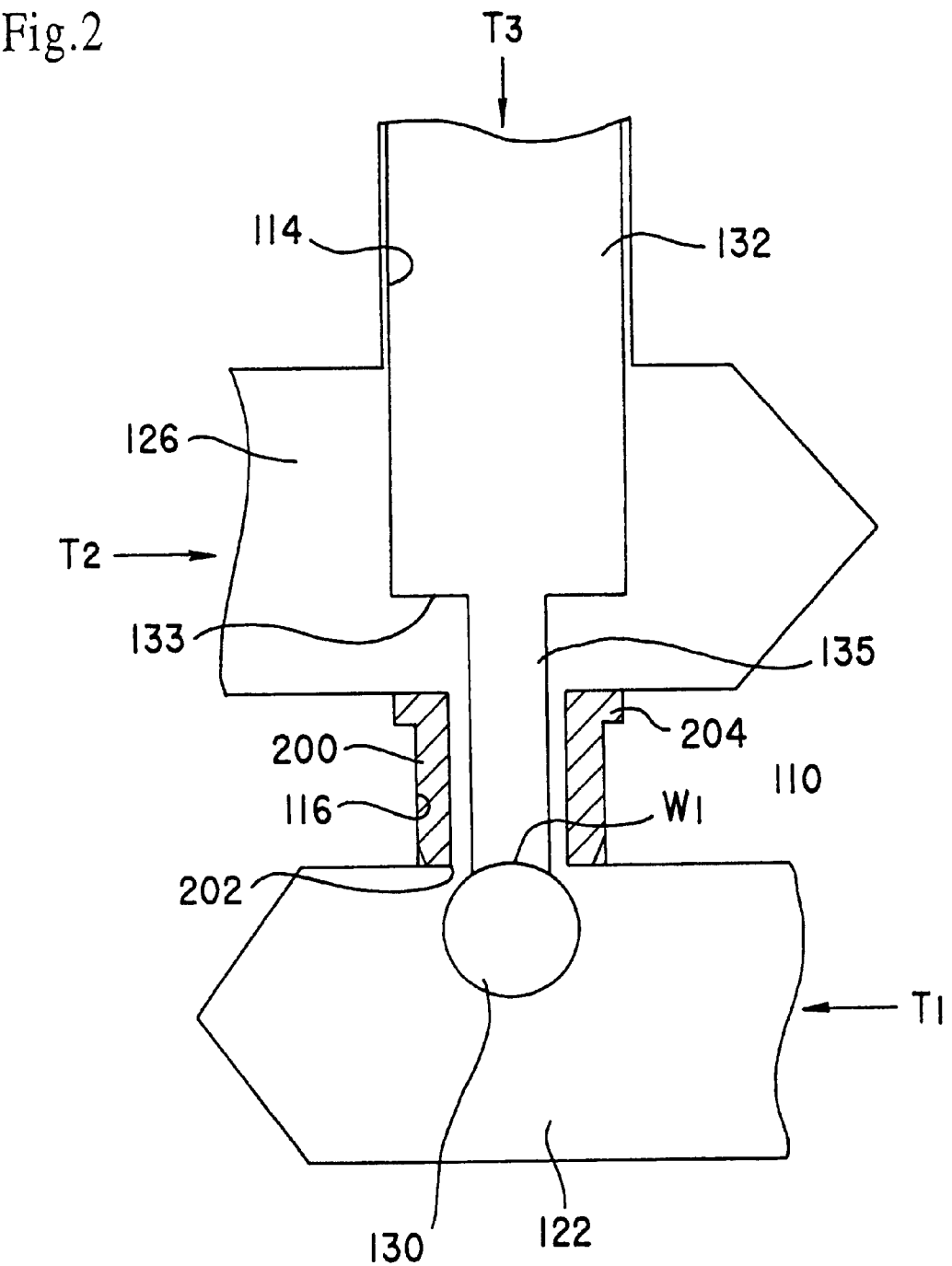
FIG. 2 is a cross-sectional view showing the main portion of the thermal expansion valve according to the present invention.
Figure 3:
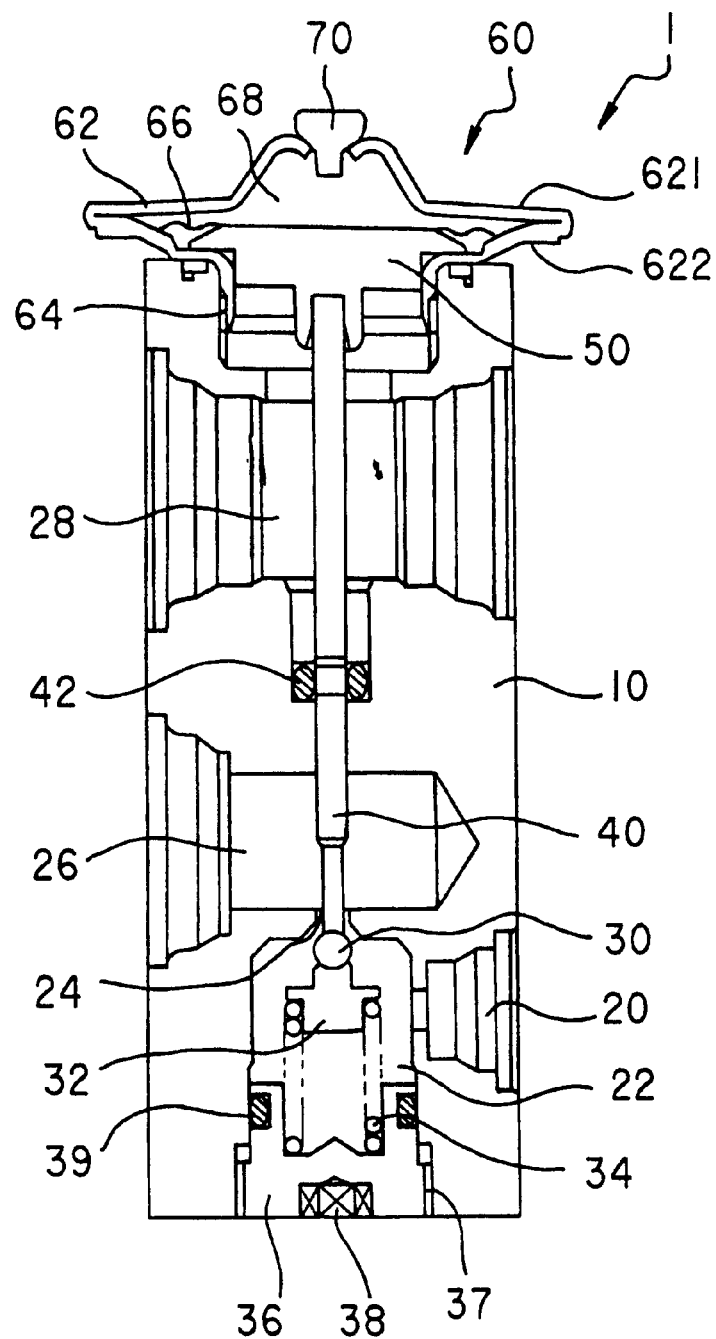
FIG. 3 is a cross-sectional view showing the thermal expansion valve according to the prior art.

FIG. 2 is an enlarged view showing the structure near the valve seat member according to the embodiment shown in FIG. 1.

The first passage 120 and valve chamber 122 is formed by machining the valve body 110 from arrow $T_1$ direction.

The second passage 126 is similarly formed by machining the valve body 110 from arrow $T_2$ direction.

The valve seat member 200 is press fit and fixed to the hole 116 constituting the orifice passage formed to the valve body from arrow $T_3$ direction.

The valve seat member is made for example of stainless steel and shaped like a pipe with a flange 204.

The valve seat member 200 is prepared by penetrating a small-diameter portion 135 of the working rod 132 therethrough in advance, and welding the spherical valve means 130 to the tip of the small-diameter portion 135 by welding $W_1$.

The members constituting the valve means 130, the valve seat member 200 and the working rod 132 are inserted through the hole 114 of the valve body 110, and the valve seat member 200 is press fit to the hole 116 formed to the valve body 110.

The step portion 133 of the working rod 132 functions as a press fit tool for press-fitting the valve seat member 200 into position.

According to the above structure, the valve mechanism can be completed by machining the valve body from one direction and by press fitting the valve seat member into position.

The fixing of the valve seat member to the hole 116 is not restricted to press-fitting, but can be performed by welding or by screwing.

The thermal expansion valve according to the present invention requires reduced number of parts and can be manufactured at low cost since it adopts a simple structure.

Moreover, since the valve chamber is formed to the hole with a bottom portion and comprises no sealing structure, refrigerant leak will not occur.

What is claimed is:

1. A thermal expansion valve comprising:
    a valve body, a first passage formed to the valve body through which high pressure refrigerant travels, a valve chamber formed within the first passage, a second passage formed to the valve body in parallel with the first passage through which refrigerant traveling toward an evaporator travels, an orifice passage disposed between the valve chamber with the second passage, a valve means positioned opposing the orifice passage, a third passage through which refrigerant being sent out of the evaporator travels, and a temperature sensing rod for sensing the temperature of the refrigerant traveling through the third passage and driving the valve means according thereto wherein the valve seat member is sized to be slidably received in the orifice passage and fixedly connected to the valve body to control an amount of refrigerant that flows in the second passage from the first passage and the temperature sensing rod is slidably received in the valve seat orifice.

2. The thermal expansion valve according to claim 1, wherein the working rod comprises a small-diameter portion being inserted to the valve seat member, and having a spherical valve means fixed to the end of the small-diameter portion.

3. The thermal expansion valve according to claim 1, wherein the valve seat member is mounted between the working rod and the valve means in advance before it is fixed to the orifice passage, and an opening area of the orifice passage is adjusted by displacement of the valve means.

4. A thermal expansion valve, comprising:

a valve body extending along a longitudinal axis and having a first passage extending partially into the valve body in a transverse direction relative to the longitudinal axis, a second passage extending partially through the valve body in the transverse direction, a third passage extending through the valve body in the transverse direction with the second passage being disposed between the first and third passages along the longitudinal axis and a hole extending longitudinally from one end of the valve body and partially therethrough to form a lower pressure chamber portion, a lower pressure chamber hole portion for fluid communication between the lower pressure chamber and the third passage, a vertical hole portion extending between the third passage and the second passage and an orifice passage portion extending between the second passage and the first passage;

a power element connected at the one end of the valve body and including a stopper facing the lower pressure chamber portion;

valve means;

a valve seat member fixedly disposed in the orifice passage portion and forming a longitudinally-extending valve seat member orifice and a valve seat facing the first passage;

a working rod slidably disposed in the hole and the valve seat member orifice with a first working rod end in contact with a stopper and an opposite second working end connected to the valve means positioned in the first passage and the operative to engage the valve seat, wherein the working rod is resiliently bias to cause the valve means to move towards the valve seat.

5. A thermal expansion valve according to claim 4, wherein the valve seat member includes a flange facing the second passage.

6. A thermal expansion valve according to claim 4, wherein the working rod includes a large diameter portion and a small diameter portion being smaller than the large diameter portion, the small diameter portion connected at a distal end of the large diameter portion forming a stepped portion disposed between the large diameter portion and a small diameter portion, the small diameter portion sized to slide along the orifice passage portion.

7. A thermal expansion valve according to claim 6, wherein the stepped portion is sized to contact the flange.

* * * * *